United States Patent [19]

Johnson

[11] 3,813,552

[45] May 28, 1974

[54] IMAGE ROTATION DEVICE FOR AN INFRARED SCANNING SYSTEM OR THE LIKE

[75] Inventor: Ralph B. Johnson, Huntsville, Ala.

[73] Assignee: Texas Instruments Incorporated, Dallas, Tex.

[22] Filed: Jan. 2, 1973

[21] Appl. No.: 320,402

[52] U.S. Cl. .................. 250/347, 250/351, 250/353, 350/22

[51] Int. Cl. .......................... G02b 23/02, G01t 1/16

[58] Field of Search ........... 250/347, 351, 353, 340; 350/7, 22, 23

[56] References Cited

UNITED STATES PATENTS

| | | | |
|---|---|---|---|
| 815,657 | 3/1906 | Swasey | 350/23 |
| 882,762 | 3/1908 | Jacob | 350/23 |
| 2,873,381 | 2/1959 | Lauroesch | 250/347 |
| 3,590,246 | 6/1971 | Menke | 250/347 |
| 3,594,578 | 7/1971 | Ohman | 250/347 |

*Primary Examiner*—James W. Lawrence
*Assistant Examiner*—Harold A. Dixon
*Attorney, Agent, or Firm*—Harold Levine; Alva H. Bandy; Rene' E. Grossman

[57] ABSTRACT

An infrared scanning system which does not require the use of scanning mirrors is disclosed. A cylindrical device having two cylindrical optical elements arranged in an afocal manner forms an image at infinity. As the cylindrical device is rotated about its longitudinal axis the image is rotated about the longitudinal axis at twice the rotational rate of the rotation of the device. A lens system focuses infrared energy radiating from the scene on an array of detectors supported at one end of a support member. An array of emitters is mounted on the opposite end of the support member and the electronics necessary to interface the detector array with the emitters is mounted on the outer surface of the support member. The central portion of the support member also includes a mechanical cryogenic refrigerator for cooling the detector array. A television camera is focused on the emitter array to produce a television image of the scene scanned.

8 Claims, 11 Drawing Figures

IMAGE ROTATION DEVICE FOR AN INFRARED SCANNING SYSTEM OR THE LIKE

This invention relates to an improved apparatus for optical scanners and more particularly to an optical scanner having an image rotation device providing the scanning action for an infrared detector.

Prior art infrared optical scanners were expensive to build and required expensive maintenance to assure that these systems operated within a reasonable degree of reliability. Many of these systems also failed to fully utilize the capabilities of available infrared detectors. Many of these disadvantages were directly traceable to the necessity for using rotating mirrors in the optical portions of these systems in order to achieve scanning.

Typical prior art infrared scanning systems employed one or more rotating mirrors positioned between the lens system and the detector array in order to deflect the infrared radiation to cause the field of view of the detector to be shifted to scan the scene of interest. A similar mirror positioned between the emitter array and the projection lens deflected the output of the emitter array to create an image of the areas scanned. These mirrors presented a multiplicity of problems.

An inherent problem in this arrangement was that the mirrors had to be positioned between the lens system and the detector and emitter arrays. The presence of these mirrors placed severe restraints on the design of the lens system because there was always a considerable distance between the array and the first lens of the lens system associated therewith. Additional problems were presented by the fact that the rotating mirror used with the detector array also had to be in line with respect to the rotating mirror used with the emitter array.

An apparatus designed to eliminate the mirror scanning system is disclosed in co-pending U.S. Pat. Application, Ser. No. 209,329, filed Dec. 17, 1971, "METHOD AND APPARATUS OF SCANNING ELECTRO MAGNETIC RADIATION USING ROTARY DETECTORS-EMITTERS AND CONTROLS CIRCUITRY." In the co-pending Patent Application, the detector array is mounted on one end of a rotating support member and the emitter array is mounted on the other end of the same member. All the electronics circuitry necessary to interconnect the detector array with the emitter array is mounted around the outer surface of the rotating support member. The support member also includes a system for cooling the detector array and a cold shield for protecting the detector array for unwanted infrared radiation. The support member is supported at each end by bearings and rotated about its longitudinal axis by a drive motor. Rotating the support member causes both the emitter and detector arrays and all the electronics associated therewith to be rotated.

A lens system focuses infrared radiation from the scene of interest onto the detector array. The detectors comprising the array are mounted in a substantially straight line centered about the axis of rotation. Rotating the support member and the detector array attached thereto causes the detector array to scan the area within the field of view of the lens system. Although the system replaces the mirror scanning system, the rotary structure, which includes the cooler, circuit board, Dewar, emitter head, and the power supplies, rotates at speeds of up to 1,800 rpm; this presents a serious dynamic balancing problem. Attempts to replace the lens system with other image rotation devices such as, for example, the Double Dove prism, Harting-Dove prism, or the Pechan prism proved fruitless as these devices have long path lengths in infrared energy absorbing media. For example, a Pechan prism made of germanium with a 2 inch aperture has almost a ten inch path length through which the infrared energy must pass; this results in the absorption of a large amount of the infrared energy. The absorption of the infrared energy by the abovementioned prisms substantially reduces the detection capability of the optical scanner.

Accordingly, it is an object of the invention to provide an improved scanning system.

Another object of the invention is to provide an infrared scanner in which scanning is achieved by rotating a lens system.

Another object of this invention is to provide an infrared scanning system utilizing an image rotation device.

Another object of the invention is to provide an infrared scanning system in which the lens system can be placed at any convenient distance with respect to the detector and emitter arrays.

Briefly stated the invention provides an image rotation device which in one embodiment can be added to the lens system of an existing infrared scanner system; in another embodiment, the image rotation device can be incorporated into the lens system.

In the first embodiment the image rotation device rotates the image of a scene before the lens system and the lens system focuses the infrared radiation pattern of the scene onto the detector array. In the second embodiment the image rotation means is incorporated in the lens system and both rotate to rotate the image of interest while focusing the infrared energy pattern thereof on the detector array.

The detector array is mounted on one end of a support member and the emitter array is mounted on the other end of the same member. All the electronics circuitry necessary to interconnect the detector array with the emitter array is mounted around the outer surface of the support member. The support member also includes a system for cooling the detector array and a cold shield for protecting the detector array from unwanted infrared radiation.

A television camera is focused on the emitter array. As the image rotating lens system is rotated the emitter array reproduces the scene scanned thereby. The emitter array has a number of elements equal to the number of elements in the detector array and the elements of the emitter and detector array are similarly positioned. The electronic circuitry couples the output of each element of the detector array to a correspondingly positioned element of the emitter array. Circuitry is adjusted such that the output of each of the emitters has a predetermined relationship to the amount of infrared rediation impinging upon the detector with which it is associated. The output of the television camera is a conventional display with the intensity of each portion of the display having a predetermined relationship to the infrared radiation emitted brom the corresponding portion of the scene scanned by the detector array.

A temperature reference source is also included in the system. The temperature of the reference source is controlled so that it is maintained to correspond to the average temperature of the scene being scanned. Periodically the field of view of the detector is switched from the scene being scanned to the temperature reference source. The average output of the detector array during the time when the detector is looking at the reference source is compared to the average output of the detector array when the scene is being scanned to generate signals which adjust the temperature reference source to correspond to the average temperature of the scene being viewed. The output signals from the detector array during the time when the temperature reference source is being viewed is used as a reference signal for restoring the d.c. level of the signals driving the emitter array.

The detector array is mounted in a chamber which includes a getter to maintain a vacuum within this chamber. This feature entirely eliminates the need for the mechanical vacuum pump associated with prior art systems.

The above discussed objects, other objects and features of the invention will become more readily understood in the following detailed description taken in conjunction with the drawings in which.

Figure 1:
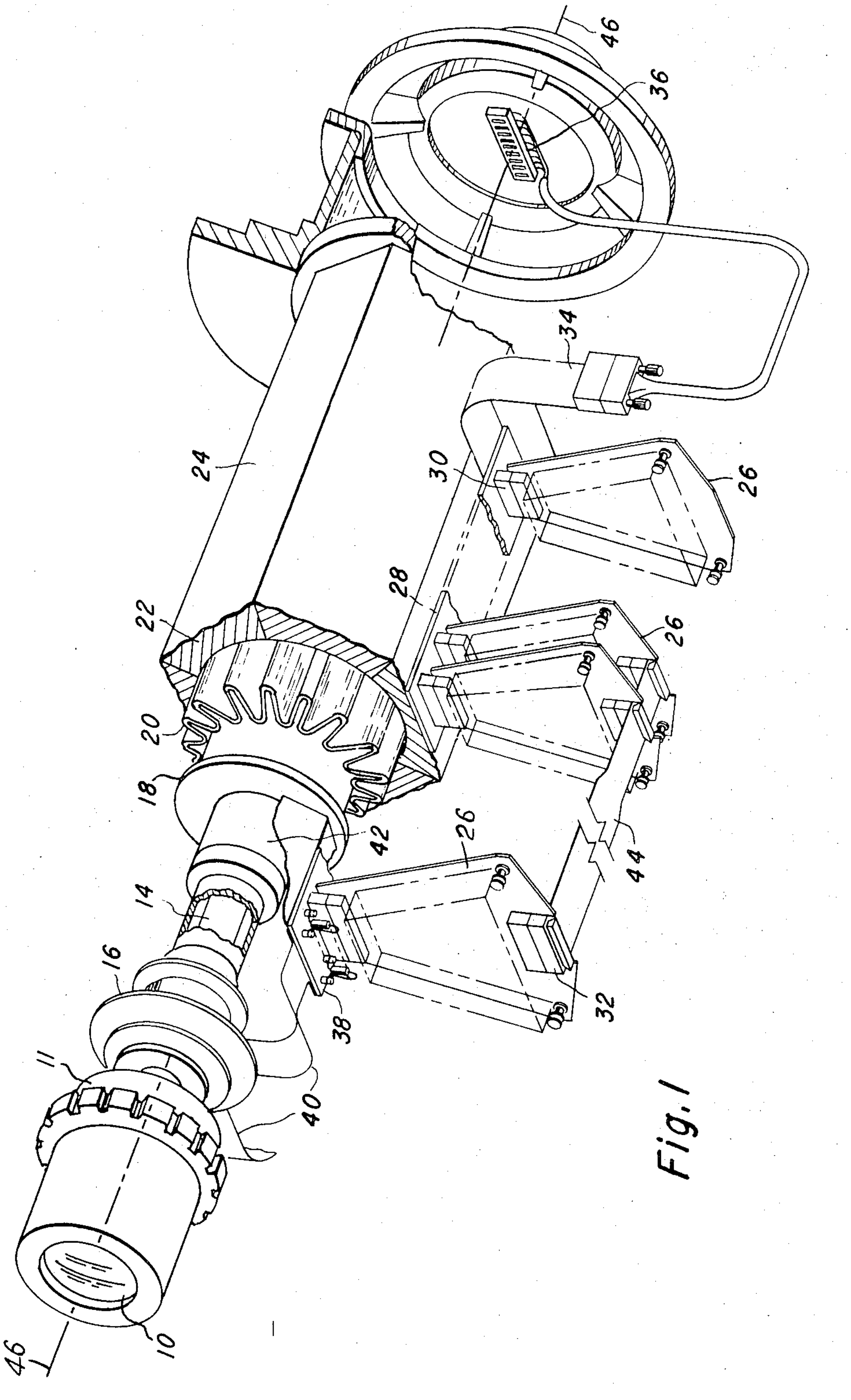
FIG. 1 is a pictorial drawing of the scanner system with the housing removed.

Referring now to FIG. 1, there is shown in pictorial form the basic components of the scanner system which in the preferred embodiment operates in the infrared region. Included therein is an optical cylindrical lens system 10 mounted in whole or in part for rotation before a stationary lens system 11 for an array of infrared detectors 12. (FIG. 3) The detectors 12 are mounted on a cold finger 14 of a dewar 16. The cold finger 14 is maintained at approximately 50°K by a sterling cycle refrigerator 18 (FIG. 1). Positioned around the sterling cycle refrigerator 18 is a heat exchanger 20. In the completed system, air is circulated through the heat exchanger 20 to remove heat from the sterling cycle refrigerator 18. Around the outer perimeter of the heat exchanger 20 is positioned mounting member 22. The inner surface of the mounting member 22 is a circle and the outer surface 24 is flat. Circuit boards 26 are mounted on each of the flat surfaces 24 and around the neck portion of the dewar 16. Only one row of circuit boards 26 are shown for simplicity of illustration.

A motherboard 28 is mounted along each of the flat surfaces 24 and a plurality of connectors 30 are connected thereto. The second half of connector 30 is attached to circuit boards 26 enabling those boards to be plugged into the motherboard 28. A connector 32 may also be mounted on the top portion of each of the circuit boards 26. Only selected circuit boards will include this connector. The use of this connector 32 will be subsequently explained. Attached to one end of the motherboard 28 is an output cable 34 which is coupled to an array of light emitting diodes 36. The array of light emitting diodes 36 includes a diode corresponding to each element of the array of infrared detectors 12. The details of the light emitting diode array 36 will also be discussed later.

The motherboards 38 positioned along the neck portion of the dewar 16 are interconnected to the array of infrared detectors 12 by a cable 40. A separate cable 40 is included for each row of circuit boards. The circuit boards 26 mounted along the neck portion 42 of the dewar 16 are interconnected with the circuit boards mounted around the heat exchanger 20 by a cable 44. Cable 44 is connected to the top portion of the circuit boards 26 by a connector 32 attached to the top portion of selected ones of circuit boards 26. The detailed function of the circuit boards 26 will be described later. Other similar circuit boards and the power supply to operate the electronics are distributed around the other flat surfaces 24 of the mounting member 22.

The array of detectors 12 (FIG. 3) is cooled by energizing the sterling cycle refrigerator 18 (FIG.1). The optical cylindrical lens system 10 is positioned so that its center axis is along axis 46 to rotate in front of the lens system 11 and detector array mounted in dewar 16 to scan an infrared emitting target and to focus infrared energy on the array of detectors 12. The electronic circuitry mounted on circuit boards 26 is adjusted so that the output of each element of the array of light emitting diodes 36 has a predetermined relationship to the infrared radiation impinging upon its corresponding member in the detector array 12. This permits the scene of interest to be scanned by the process of rotating the optical cylindrical lens system about axis 46 as compared to the prior art systems in which either the detector system was rotated or in which scanning mirrors were required between the lens system and the detector array and also between the emitter array 36 and the screen or television camera (not shown) on which the output of the emitter array was projected to reproduce the scene.

Figure 2:
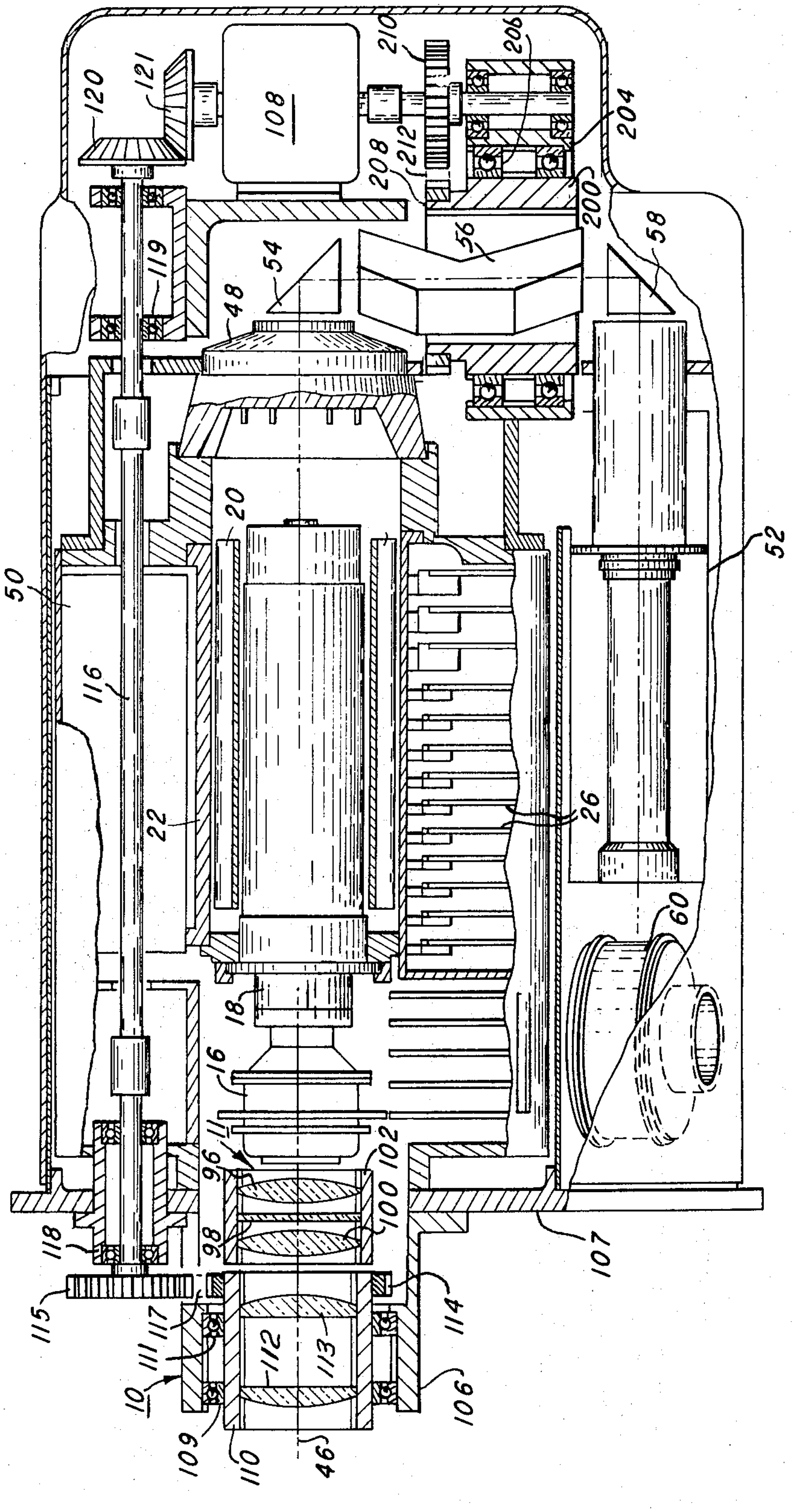
FIG. 2 is a cross-sectional view of the scanner system constituting an embodiment of the invention.

Referring now to FIG. 2, which is a cross section of the scanner taken along the axis of rotation 46, it can be seen that the dewar 16 is coupled to one end of the sterling cycle refrigerator 18. Emitter head assembly 48 is coupled to the refrigerator 18 through mounting member 22. The circuit boards 26 are mounted around the refrigerator 18 and on mounting member 22. The edge view of typical circuit boards can be seen in this FIGURE. One of the power supplies 50 is also shown symbolically in this view.

A television camera 52 is focused on the array of light emitting diodes (not shown in this Figure) through prisms 54, 56 and 58 to produce a television image of the scene scanned by the array of infrared detectors. The television camera 52 is mounted substantially parallel to the axis 46. The image is deflected 90° by prism 54, transmitted through a rotating prism 56 and then deflected another 90°by prism 58 causing the image to impinge upon the television camera 52. Prism 56 is designed such that the image of the scene as seen by the television camera can be rotated by rotating this prism. This provides a convenient means of unscrambling the scene displayed and aligning the television image with the image as seen by the array of infrared detectors mounted in dewar 16. The prism 56 is mounted in a housing 200. The housing 200 is mounted in bearing 204 and 206 attached to scanner housing 107. A ring gear 208 is mounted in the housing 200. The housing 200 has its ring gear 208 connected to a gear 210 by a link chain 212. The gear 210 is driven by the drive shaft of motor 108 to rotate the prism 56.

A fan 60 is used to circulate air through the heat exchanger 20 to remove heat from the sterling cycle refrigerator 18 and around the outer edge of the rotary portion to cool the printed circuit boards 26 and the power supplies 50.

Figure 3:
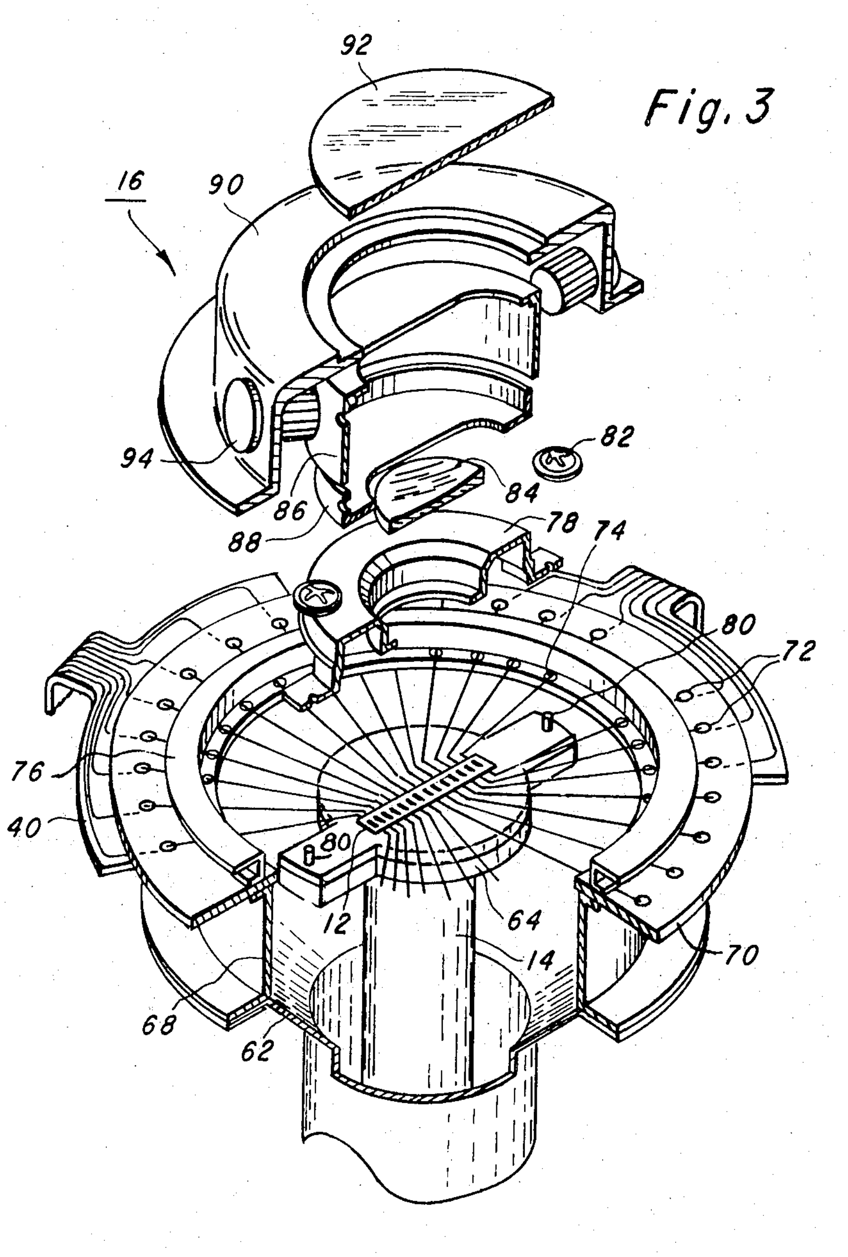
FIG. 3 is an exploded view of the dewar in which the detector array is mounted and the image rotation device for the lens system.

Referring now to FIG. 3, there is shown an exploded break away view of details of the detector dewar 16. The dewar includes a lower vacuum jacket 62. This jacket is somewhat funnel-shaped with a flat upper lip portion and a neck portion which extends and attaches to the sterling cycle refrigerator 18. The vacuum jacket 62 could also be cylindrical in shape, the exact shape being a matter of convenience. The cold finger 14 extends through the neck portion of the lower vacuum jacket 62 and the array of infrared detectors 12 is mounted thereon. A substrate 64 electrically insulates the array of infrared detectors 12 from the cold finger 14. Positioned immediately above the lower vacuum jacket 62 is a lower sealing ring 68. The lower sealing ring 68 has lip portions at both the bottom and top edges. The lower lip portion is attached to the lip portion of the lower vacuum jacket 62 by brazing or other suitable means.

Positioned immediately above the lower sealing ring 68 is a feed-through substrate 70. This substrate is an electrical insulator such as ceramic, and has a series of terminals 72 disposed around it outer perimeter. The number of terminals 72 disposed around the outer perimeter of the feed-through substrate 70 will be determined by the number of elements in the array of infrared detectors 12. A second series of terminals 74 are disposed along the inner perimeter of the feed-through substrate 70 with the terminals 72 and 74 being interconnected. The leads interconnecting the outer and inner terminals 72 and 74 are covered with a thin layer of insulating materials such as ceramic, and the upper sealing ring 76 may be bonded to the feed-through substrate 70 by forming a thin layer of gold, for example, on the feed-through substrate 70 and brazing the upper sealing ring 76 to the gold layer. The lower sealing ring 68 is similarly bonded to the other side of the feed-through substrate 70.

A lens mounting ring 78 is secured to the cold finger 14 by positioning the lens mounting ring 78 such that the small rod like portions 80 on the cold finger 14 extend through openings in the lens mounting ring 78 and securing this ring in position with push nuts 82. A lens 84 is then positioned in the lens mounting ring 78 and secured therein by any suitable means. Mounted on top of the lens mounting ring 78 is a cold shield 86 which has an elongated opening therein to limit the field of view of the array of infrared detectors 12 to the desired angle. Immediately below the cold shield 86 and secured thereto is a cold shield baffle 88. The cold shield 86 and the cold shield baffle 88 are in good thermal contact with the cold finger 14. The cold shield baffle 88 acts as a shield to prevent unwanted infrared radiation from impinging upon the array of infrared detectors 12. The cold shield baffle 88 also has an elongated opening therein to limit the field of view of the array of infrared detectors 12 to the desired angle.

Positioned immediately above the upper sealing ring 76 is the upper vacuum jacket 90. The upper vacuum jacket has a circular opening therein in which a window 92 is positioned. The window 92 is formed of a material which has good transmitting characteristics in the infrared region of the electromagnetic radiation spectrum. The window 92 may be made from Itran-2 for example. Itran 2 is a press-sintered zinc sulfide available from Eastman Kodak Company, Rochester, N.Y. The upper vacuum jacket 90 is attached to the upper sealing ring 76 by brazing or some other suitable technique.

Mounted around the outer perimeter of the upper vacuum jacket 90 is a series of getter type vacuum pumps 94. The function of these pumps is to absorb any molecules of gas which are inside the dewar to maintain a vacuum therein. A suitable vacuum pump is manufactured and sold by Socoeta Apparecchi Elettricie Scientifics.

It is necessary to maintain a vacuum in the dewar 16 in order to assure that the sterling cycle refrigerator 18 will have the capability of maintaining the detector array 12 and the other parts of the dewar assembly at a sufficiently low temperature to assure that the detector array 12 operates at reasonable efficiency. The getter-type vacuum pumps 94 are a substantial improvement over the mechanical vacuum pumps formerly employed because they do not require complicated high vacuum lines to connect the dewar 16 to the vacuum pump.

The series of flat cables 40 also terminate at the outer perimeter of the feed-through substrate 70 and connect to terminals 72. This provides a convenient means of interconnecting the array of infrared detectors 12 with the electronic circuitry mounted on circuit boards 26. The lens system 11 (FIG. 2) includes three lens elements 96, 98 and 100 which, for operation in the infrared region, may consist of three germanium elements. The lens system 11 is mounted in a housing 102 having one end secured to the face portion of the upper vacuum jacket 90 (FIG. 3) so that the lenses are centered on axis 46 (FIG. 2) in the energy path to the detector array inside the dewar 16.

The rotating cylindrical lens system 10 includes a cylindrical support 106 rigidly secured to the face of the scanner housing 107. If preferred, the cylindrical housing 106 can be an extension of the scanner housing 107. An electric motor 108 is used to rotate a cylindrical housing 110 within the cylindrical support 106 on bearings 109 and 111. The housing 110 has a segmented cylindrical lens 112 and 113 secured adjacent each end. The segmented cylindrical lenses 112 and 113 are arranged in the housing 110 in an afocal manner. A ring gear 114 is mounted on the cylindrical housing 110 and a circular gear 115 is secured to one end of a rod 116. A link chain 117 interconnects the gears 114 and 115. The rod 116 is supported by bearings 118 and 119 mounted in opposite ends of the scanner housing 107. A bevel gear 120 is attached to the other end of rod 116 to mesh with a second bevel gear 121 attached to the drive shaft of the motor 108. A real image is formed between the two elements 112 and 113 by rotating the optical elements as a unit about the longitudinal axis 46. The image from the second element (formed at infinity in this case) rotates about the longitudinal axis at twice the rotational rate of the optical system. When the lens system 11, which is rotationally symmetric, is located after the afocal cylindrical lens system 10, then a normal image of the scene is observed in the focal plane. This image will rotate at twice the rotational rate of the afocal system. A unity power afocal is assumed, but is not a requirement of the described device. The result of using a non-unitary power afocal system is to have the magnification vary as a function of position in the image plane.

Figure 4:
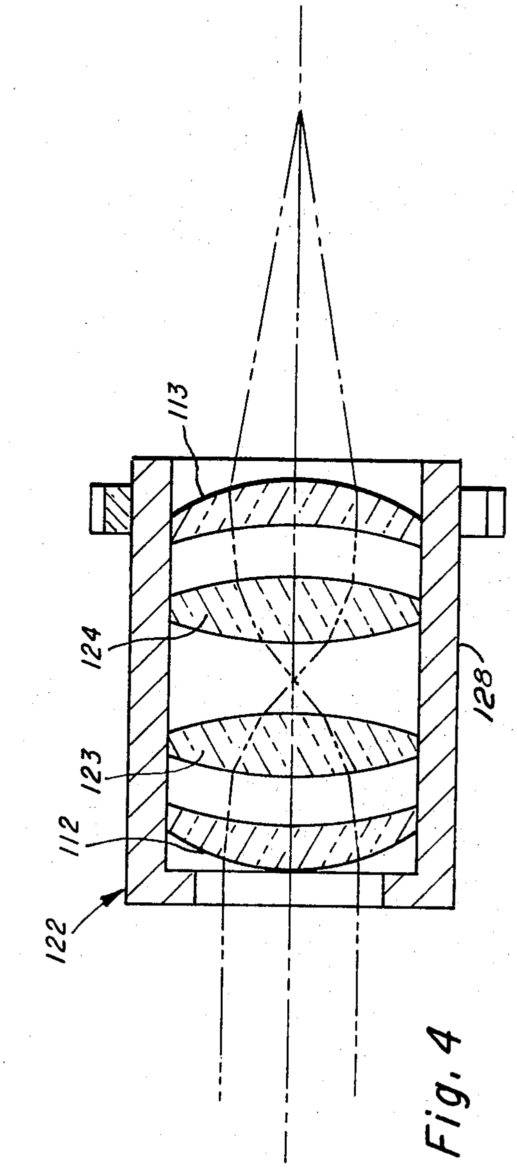
FIG. 4 is a schematic view of a combined image rotation cylindrical elements system and lens system showing the cylindrical elements with their cylindrical axes vertical as to the image.
Figure 5:
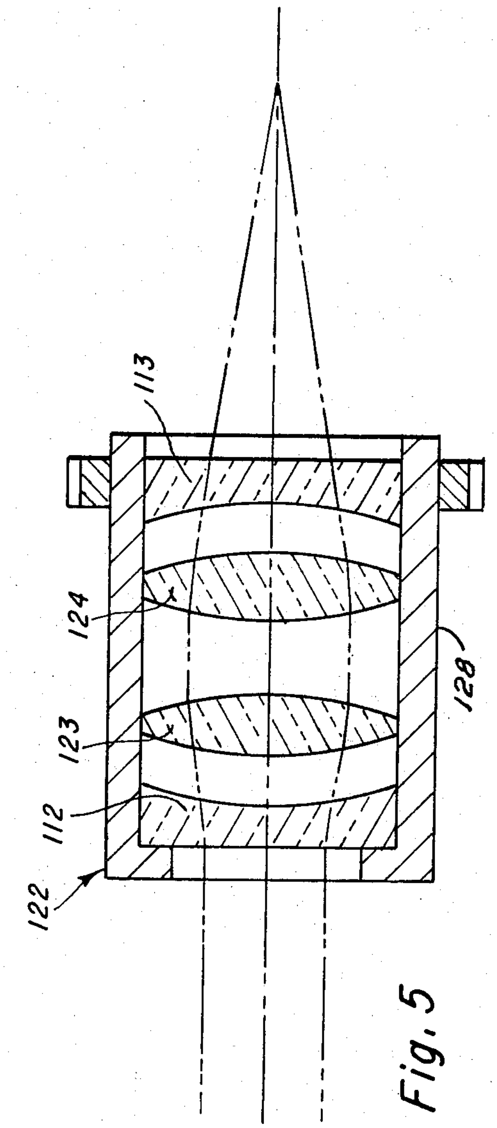
FIG. 5 is a schematic view of the combined image rotation cylindrical elements system and lens system showing the cylindrical elements with the cylindrical axes horizontal as to the image.

An alternative system is shown schematically in FIGS. 4 and 5 in which the optical cylindrical lens system 10 and the lens system 11 are combined. FIG. 4 shows the ray paths for an axial object at infinity when the optical cylindrical lens system 10 is incorporated into the lens system 11 and the axes of the cylindrical lenses 112 and 113 are vertical to the plane containing the page. The combined system 122, which may be of any desired configuration, but which as shown consists of two complex lenses 123 and 124 of the lens system positioned between the cylindrical optical elements 112 and 113. The complex lens 123 and 124 and the cylindrical optical elements 112 and 113 are mounted in a rotatable housing 128. The rotatable housing 128 is rotatably mounted on the face of the upper jacket 90 of the dewar 16 (FIG. 3). The motor and drive arrangement is identical to that shown in FIG. 2 and therefore need not be described again. By rotating the combined system 122 the optical image is rotated at twice the rotational rate of the system. Thus, the speed of rotation of either system need only be one-half as fast as is necessary to produce desired scanning action. FIG. 5 shows the ray paths for an axial object at infinity when system 10 is incorporated into the lens system 11 and the axes of the cylindrical lenses 112 and 113 lie in the plane containing the page.

Figure 6:
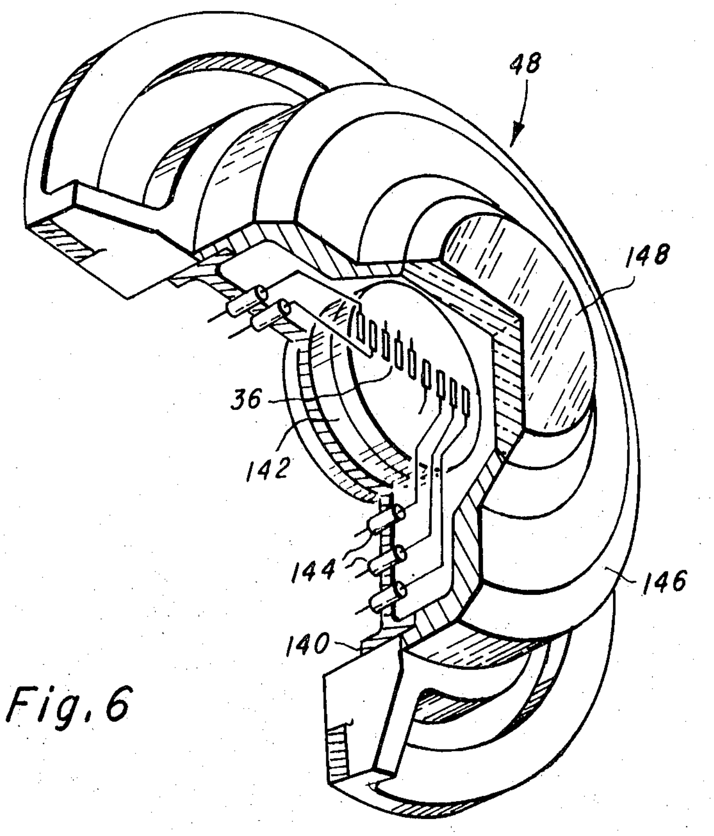
FIG. 6 is a pictorial drawing of the emitter head with portions shown in cross-section.

Referring now to FIG. 6, there is shown the details of the emitter head assembly 48. The emitter head assembly 48 includes a mounting ring 140. Positioned on the mounting ring 140 is an insulating substate 142. The array of light emitting diodes 36 is mounted on the substrate 142 and leads are bonded from each of the emitters to individual feed-throughs 144. Secured to the mounting ring 140 is a window holding ring 146. A window 148 is mounted in the window holding ring 146 to permit the array of emitters to be viewed.

Figure 7:
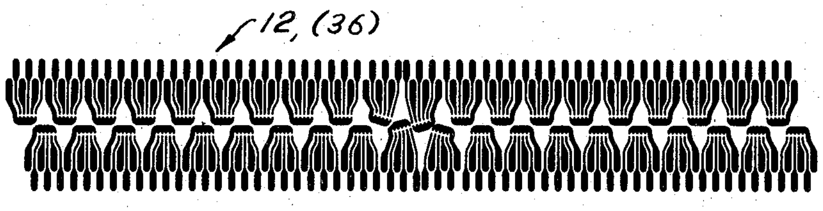
FIG. 7 is a top view of an array suitable for use as either the detector or the emitter array.

Referring now to FIG. 7, there is shown in plan view an array of diodes. This basic array configuration is suitable for use as either the detector array 12 or the emitter array 36, the basic difference between the emitters and the detectors being the semiconductor material and the impurity dopant that is used in forming the diode. In all cases, there should be a one-to-one correspondence between the number of diodes in the detector array 12 and the number of diodes in the emitter array 36. In the case of the detector array, the diodes can be made by diffusing impurities into a mercury cadmium-telluride semiconductor. In the case of the emitters the diodes may be made by selectively impurity doping gallium arsenide. In general, the emitter array 36 will have larger diodes than the detector array. However, this is not a necessary feature of the system. It should be noted that the size of the diodes in the array of infrared detectors determines the resolution of the scanner system and influences the overall size of the system. Therefore, the array should contain as many elements and each diode should be as small as practical considering the state of the art.

Figures 7A, 8:
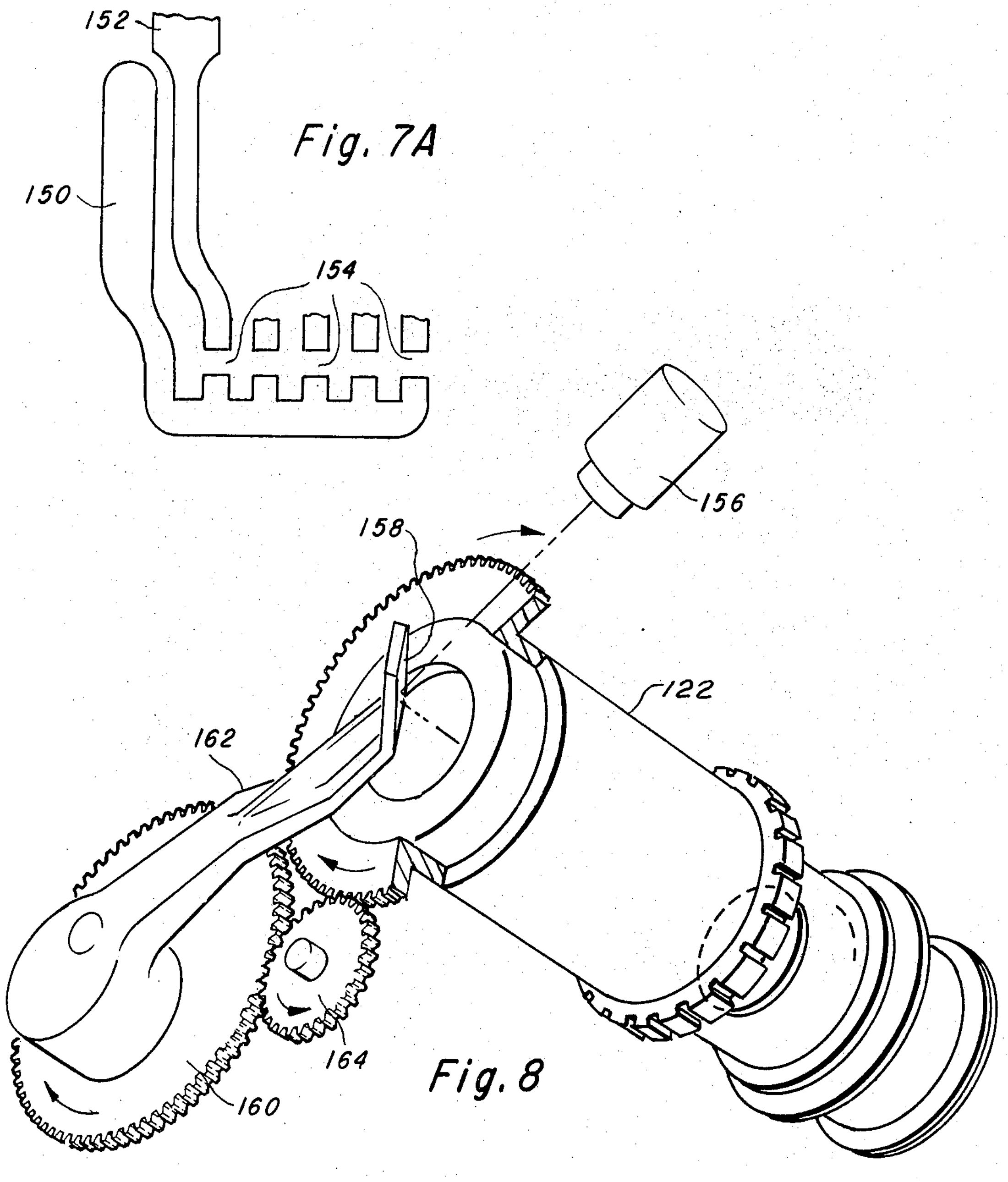
FIG. 7A is an enlarged view of one group of the diodes conprising either the detector or emitter arrays.
FIG. 8 is a pictorial view of the chopper mirror and the temperature reference source.

Referring now to FIG. 7A there is shown in detail a larger view of one of the groups of the diodes comprising the array illustrated in FIG. 7. Each of these groups of diodes include one common anode connection 150 and a separate cathode connection 152 for each diode of the array. The area between the cathode connection 150 and the anode connection 152 indicated at reference numeral 154 forms the active regions of the diodes comprising the array.

Referring now to FIG. 8, the function of the light chopper will be explained. The function of the light chopper is to periodically deflect the field of view of the array of infrared detectors 12 such that this array receives infrared radiation from a temperature reference source 156. The temperature reference source 156 is maintained at a temperature such that is emits infrared radiation equal to the infrared radiation received from the background of the scene as viewed by the array of infrared detectors 12.

The chopper includes a mirror 158 which is attached to the gear 160 by a shaft 162. An idler gear 164 couples the gear 160 to the rotating portion of the rotating cylindrical lens system 104 or combined system 118. This causes the mirror 158 to be positioned for a very short period during each rotation cycle such that the field of view of the array of infrared detectors 12 is deflected causing the array of infrared detectors 12 to receive radiation from the temperature reference source 156. This provides a reference signal to be used during the d.c. restore cycle. This will be explained in detail later.

The idler gear 164 is used to couple the gear 160 to the rotary optical cylindrical lens system in order to assure that the mirror 158 rotates in the same direction as the cylindrical lens 112 of lens system 122 (FIGS. 4 and 5). This causes less distortion of the final display than would occur should the mirror 158 and cylindrical lens 112 rotate in opposite directions.

The temperature reference source 156 is typically a heat sink mounted on thermoelectric cooler. The cooler (not shown in detail) is a thermoelectric cooler and cools the heat sink if the current is passed through the thermo-selective cooler in one direction and heats the heat sink if the current is reversed. This permits the temperature reference 156 to be either cooled or heated to maintain the temperature reference 156 at a temperature corresponding to the average temperature of the scene viewed by the scanner system.

Figure 9A:
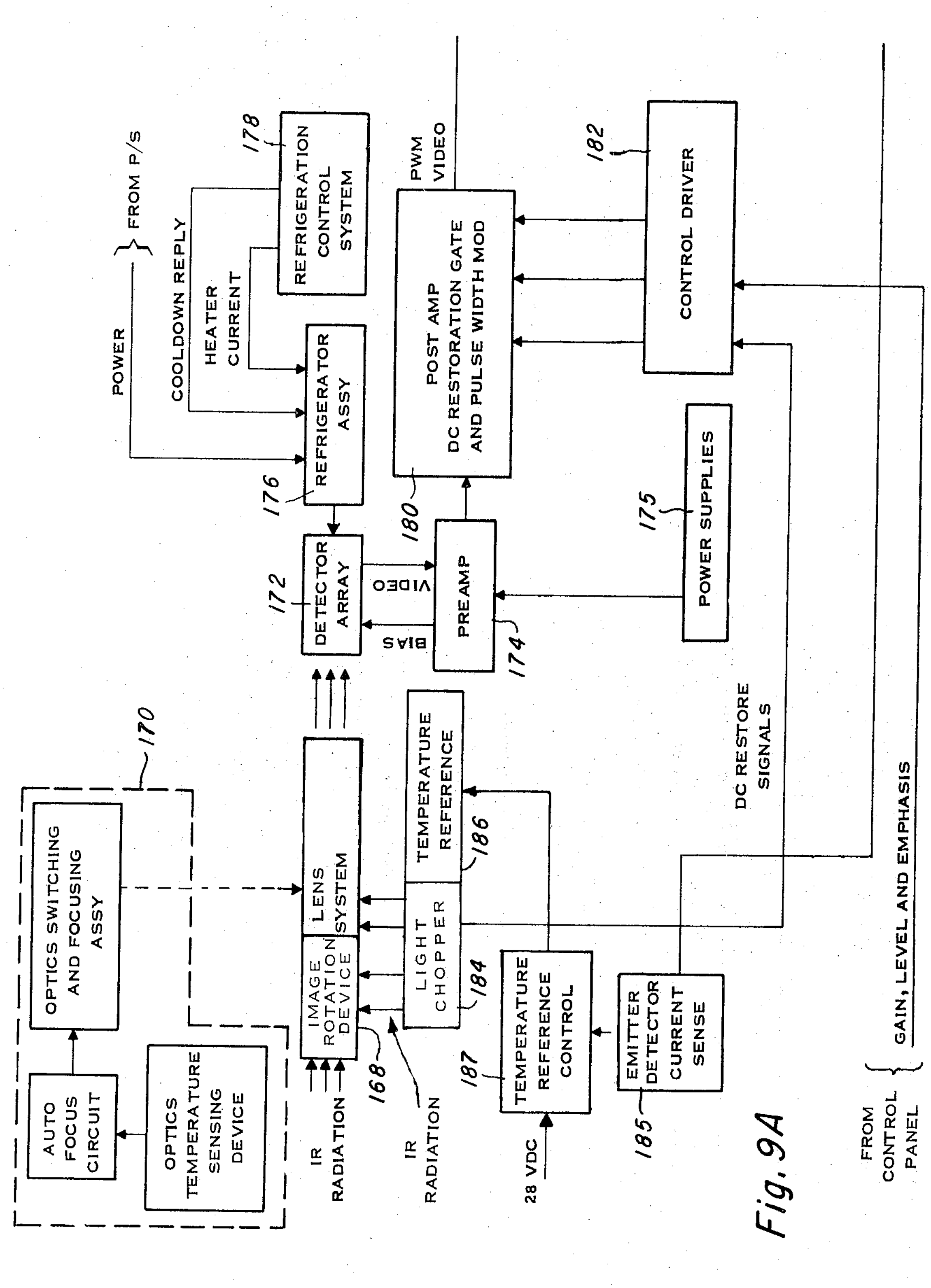
FIGS. 9A and 9B are functional block diagrams of the scanner system.
Figure 9B:
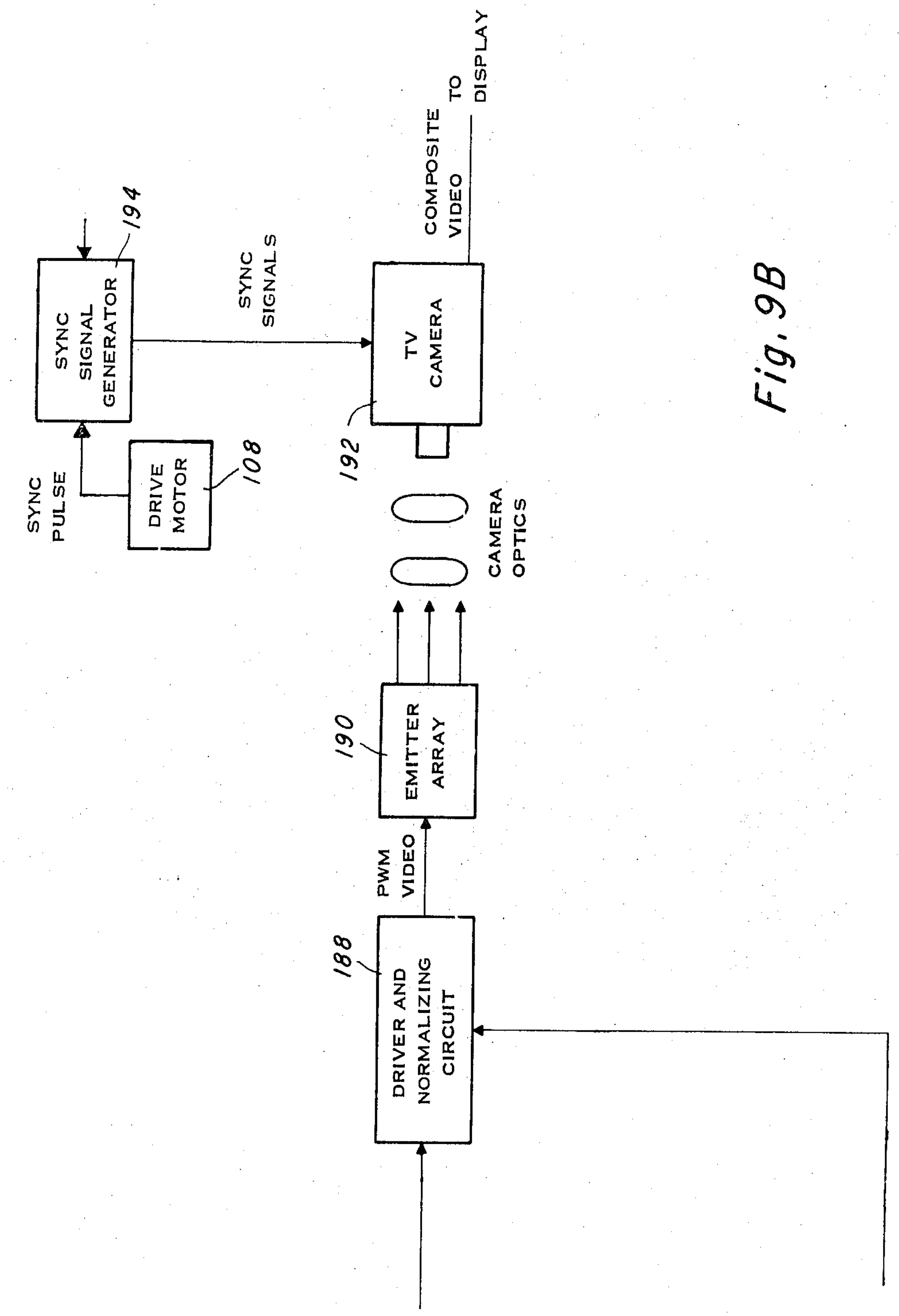

Referring now to FIGS. 9A and 9B there is shown a functional block diagram of the entire scanner system. The infrared radiation from the scene being viewed enters the system through the cylindrical optical elements shown symbolically at reference numeral 168 and passes through the lens system which also includes an automatic focusing mechanism, 170. This automatic focusing mechanism 170 refocuses the lens system to compensate it for changes in temperature. This feature substantially improves the performance of the scanner over the operating ambient temperature ranges. Using this technique, accurate focusing can be accomplished over temperature range from 30° to 130°F.

The detector array is shown symbolically at reference numeral 172. In operation the detector array 172 receives bias signals for biasing each of the diodes comprising the detector array 172 from the pre-amp circuit 174 and produces a video signal in response to the infrared radiation impinging upon each of the individual diodes comprising the array. The signals are amplified by pre-amp circuit 174 energized by power supply 175. The refrigerator assembly 176 is controlled by a refrigerator control system 178. The refrigerator assembly 176 includes both a cooling and heating cycle permitting the temperature of the array of infrared detectors 172 to either be increased or decreased to maintain the temperature relative constant. The cold finger and the array of infrared detectors 172 are mounted in a vacuum as previously discussed to provide an assembly in which the thermal resistance between these elements and the surrounding environment is very high. This permits the array of infrared detectors 172 to be efficiently cooled but presents a control problem because of the time required for the temperature to increase, if the temperature should be reduced too much by the refrigerator assembly 176. The refrigerator assembly 176 is provided with a heater to overcome this difficulty. The refrigerator control 178 selects the cooling or the heating cycle as required, to maintain the temperature of the detector array 172 relatively constant and at a preselected value.

The video output signal of the preamplifier 174 is coupled to a post amplifier 180. The post amplifier 180 includes all the circuitry necessary for d.c. restoration of the video signal and a pulse width modulator to porduce a pulse width modulated video signal at the output of this amplifier. The post amplifier 180 is controlled by a control driver circuit 182. The control driver circuit 182 receives gain, level, and emphasis signals from the control panel of the system and d.c. restore signals from the light chopper 184.

The output signals of the diode comprising the infrared detector array 172 are varying d.c. voltages. The average d.c. components of these signals are determined by the infrared radiation from the background of the scene being scanned. The varying (a.c.) components are due to targets emitting infrared radiation in excess of or less than the average radiation emitted by the background. The a.c. components of these signals are relatively low in amplitude making it impracticable to amplify them using direct coupled amplifiers. This problem is solved by amplifying each of these signals in the a.c. coupled preamplifier 174 and restoring the d.c. component of the amplified signal to assure that it has the proper average d.c. value.

D.C. restoration is accomplished by periodically deflecting the field of view of the scanner so that the detector array 172 receives radiation from a temperature reference 186. During this period the output of the a.c. amplifier is clamped to a reference voltage (ground being a convenient reference). This establishes the average d.c. level of the output of each of the a.c. amplifier as zero.

The output signals of all the diodes comprising the detector array 172 are averaged during the time when the scene is being scanned and during the time when the temperature reference source is being viewed. These two measurements are compared and the temperature of the temperature reference source 186 is adjusted using the temperature reference control 187 until those two measurements are equal. This prohibits saturation of the a.c. amplifier due to differential signals which would be produced by the light chopper 184 as the field of view is switched from the scene being scanned to the temperature reference 186 and vice versa if there was a large temperature differential between the background of the scene and the temperature reference 186.

The pulse width modulated video signal from the post amplifier 180 is fed into the driver and normalizing circuit 188 (FIG. 9B). This circuit generates the drive current signals for the emitter array 190. The driver normalizing circuit 188 includes a d.c. level control 185 for each element of the emitter array 190 (FIG. 9A), to permit the signal to each element of the emitter array 190 to be adjusted to produce a uniform background. The preamplifier circuit 174 also includes a gain control for each element of the detector array 172 permitting the amplitude of these signals to be adjusted to generate a display in which the output of each element of the emitter array 190 is proportional to the intensity of the infrared radiation impinging upon the corresponding element of the detector array 172. The driver control circuit 182 receives gain, level and emphasis signals from the systems control panel as previously discussed. The gain and level controls permit the system's operator to adjust the background level and the contrast of the display and the emphasis control permits the operator to adjust the display level for low level targets with respect to eye level targets so that either high level or low level targets may be emphasized with respect to the other, as desired.

Television camera 192 (FIG. 9B) is focused on the emitter array 190 and produces a composite video signal. A sync signal generator 194 receives sync pulses from the special motor 108 and generates a sync signal for the television camera 192. The sync signal generator 194 receives speed light signals from the drive motor circuits (not shown) to override the scan motor sync pulses when those signals deviate from normal by an amount such that the television camera can no longer be properly synchronized.

Although the image rotation device has been discribed for use in a scanning mechanism, it could also be used as a derotation device for mirror scanners and for the rotating prism 56 of this disclosure, as well as to perform image plane scanning. Further, although the invention has been described and defined with respect to specific embodiments, it will be recognized by those skilled in the art, that many modifications and changes may be made, all of which will be within the scope of the invention as described and claimed.

What is claimed is:

1. A scanner system for scanning a scene of interest comprising:

a. an image rotation member including a pair of optical cylindrical lens elements positioned in an afocal manner;

b. an array of electromagnetic radiation detectors in the path of the rotating image for porducing electrical representations of the image of the scene, said detectors having a plurality of semiconductor diodes arranged in a predetermined pattern;

c. an array of emitters coupled to the array of electromagnetic detectors responsive to the electrical representations for producing output signals indicative of an image of the scene, said array of emitters having a plurality of semiconductor diodes arranged in a predetermined pattern; and d. a derotation member in the path of the emitter output signals for unscrambling the visible image of the scene.

2. A scanner system for scanning a scene of interest comprising:

a. an image rotation member for producing a rotating image of the scene;

b. an array of electromagnetic radiation detectors in the path of the rotating image for producing electrical representations of the image of the scene;

c. an array of emitters coupled to the array of electromagnetic radiation detectors responsive to the electrical representations for producing output signals indicative of an image of the scene; and d. a derotation member in the path of the emitter output signals for unscrambling the visible image of the scene.

3. A scanner according to claim 2, wherein said image rotation member includes a pair of optical cylindrical lens elements positioned in an afocal manner.

4. A scanner according to claim 3 further including a lens system interposed between said image rotation member and said array of electromagnetic radiation detectors for focusing said radiation on the detectors.

5. A scanner according to claim 3 further including a lens system interposed between the pair of optical cylindrical lens elements of the image rotation member for focusing said radiation on the detectors.

6. A scanner system according to claim 2 wherein said array of detectors and said array of emitters each comprises a plurality of semiconductor diodes arranged in a predetermined pattern.

7. A scanner system according to claim 2 wherein said detectors detect radiation in the infrared region of the electromagnetic spectrum.

8. A scanner system according to claim 6 wherein said emitters are light emitters operating in the visible region of the electromagnetic spectrum.

* * * * *